United States Patent
Kido et al.

(10) Patent No.: US 9,842,477 B2
(45) Date of Patent: Dec. 12, 2017

(54) LIGHTING DEVICE AND LIGHTING SYSTEM

(71) Applicant: Panasonic Intellectual Property Management Co., Ltd., Osaka (JP)

(72) Inventors: Shojiro Kido, Osaka (JP); Kazuhiro Hatta, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/495,486

(22) Filed: Apr. 24, 2017

(65) Prior Publication Data

US 2017/0309147 A1 Oct. 26, 2017

(30) Foreign Application Priority Data

Apr. 26, 2016 (JP) ................. 2016-088573

(51) Int. Cl.
- *H05B 37/02* (2006.01)
- *G08B 13/24* (2006.01)
- *H05B 33/08* (2006.01)

(52) U.S. Cl.
CPC ..... *G08B 13/2494* (2013.01); *H05B 33/0854* (2013.01); *H05B 33/0857* (2013.01); *H05B 37/0227* (2013.01)

(58) Field of Classification Search
CPC .. H05B 37/02; H05B 37/0218; H05B 37/034; H05B 37/0227; H05B 37/0281; F21V 23/0471; F21Y 2115/10; G08B 15/00; G08B 13/189; G06K 7/10118; G06K 7/10138; G06K 7/10336; G06K 7/10386; Y02B 20/44; Y02B 20/46

See application file for complete search history.

(56) References Cited

U.S. PATENT DOCUMENTS 8,632,011 B2 * 1/2014 Gao .................. G06K 7/12
235/455
8,905,610 B2 * 12/2014 Coleman ............ G02B 6/0018
362/554

(Continued)

FOREIGN PATENT DOCUMENTS

JP 2007-005262 A 1/2007
JP 2007-103236 A 4/2007

(Continued)

*Primary Examiner* — Haissa Philogene
(74) *Attorney, Agent, or Firm* — McDermott Will & Emery LLP

(57) ABSTRACT

A lighting device includes: a light source switchable between illumination modes; a human detector which detects a person in a detection area in an illumination area of the light source; an ID reader which wirelessly reads an identification stored in an RF tag in a read area corresponding to the detection area; and a controller communicably connected to the light source, the human detector, and the ID reader. The controller obtains from the human detector human detection information indicating that one or more persons are present, obtains from the ID reader one or more identifications read by the ID reader when the human detector detects the one or more persons, and applies one mode of the illumination modes to the light source based on the human detection information and one or more identifications obtained, and the light source performs illumination in the applied mode.

10 Claims, 16 Drawing Sheets

(56) References Cited

U.S. PATENT DOCUMENTS

| | | | |
|---|---|---|---|
| 9,622,328 B2 * | 4/2017 | Chen | H05B 37/0227 |
| 9,655,204 B2 * | 5/2017 | Fushimi | H05B 37/0218 |
| 2016/0092704 A1 * | 3/2016 | Russell | F21V 23/0471 |
| | | | 340/10.3 |
| 2017/0223807 A1 * | 8/2017 | Recker | H05B 37/0227 |

FOREIGN PATENT DOCUMENTS

| | | |
|---|---|---|
| JP | 2009-205286 A | 9/2009 |
| JP | 2015-075936 A | 4/2015 |
| JP | 2015-210885 A | 11/2015 |

* cited by examiner

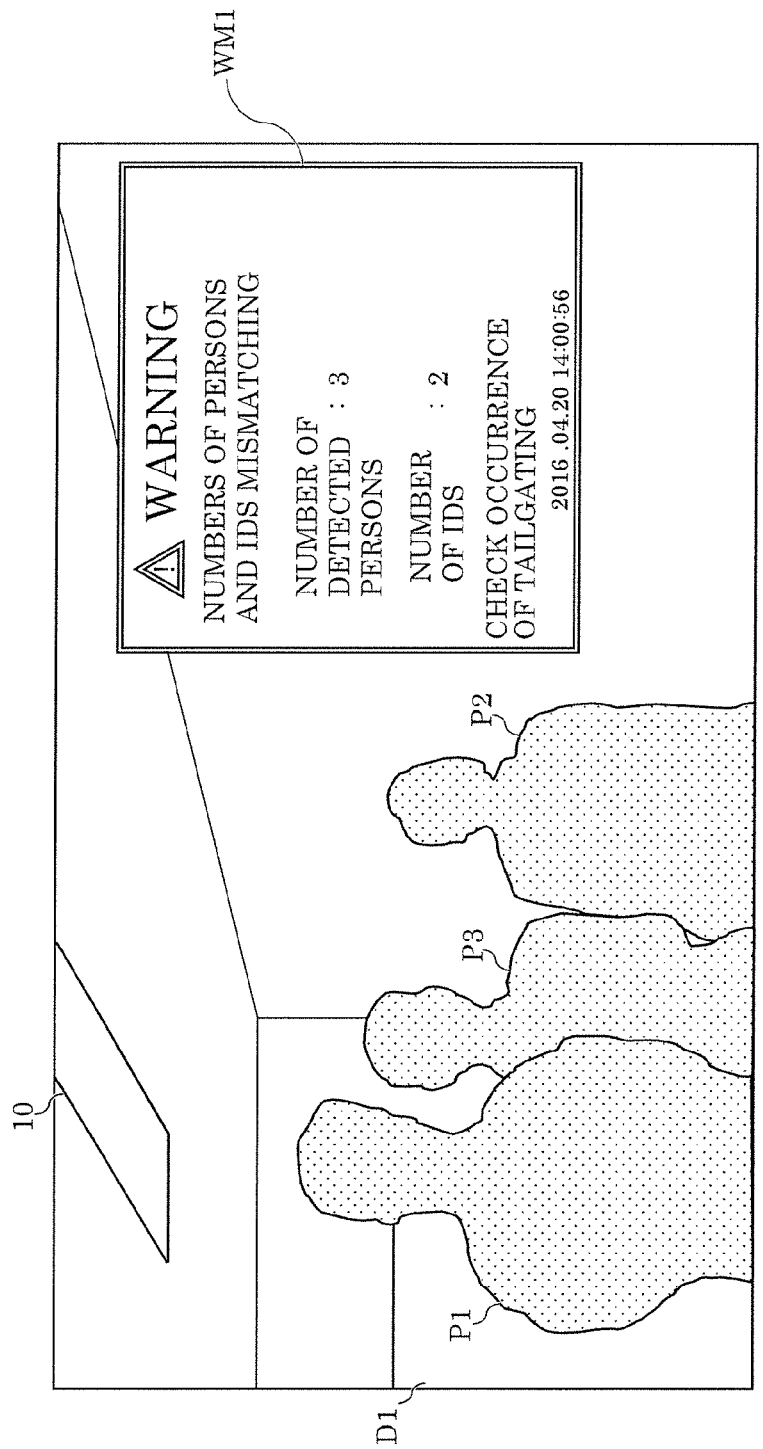

FIG. 6A

| IDENTIFICATION NUMBER | ADMITTED PERSON: 1 , UNADMITTED PERSON: 0 |
|---|---|
| ⋮ | ⋮ |
| 0100773 | 1 |
| 0100774 | 0 |
| 0100775 | 0 |
| 0100776 | 1 |
| ⋮ | ⋮ |

| IDENTIFICATION NUMBER | NORMAL MODE: 1 , ALERT MODE: 0 |
|---|---|
| ⋮ | ⋮ |
| 0000341 | 0 |
| 0000342 | 0 |
| ⋮ | ⋮ |
| 9010000 | 1 |
| ⋮ | ⋮ |

1500B

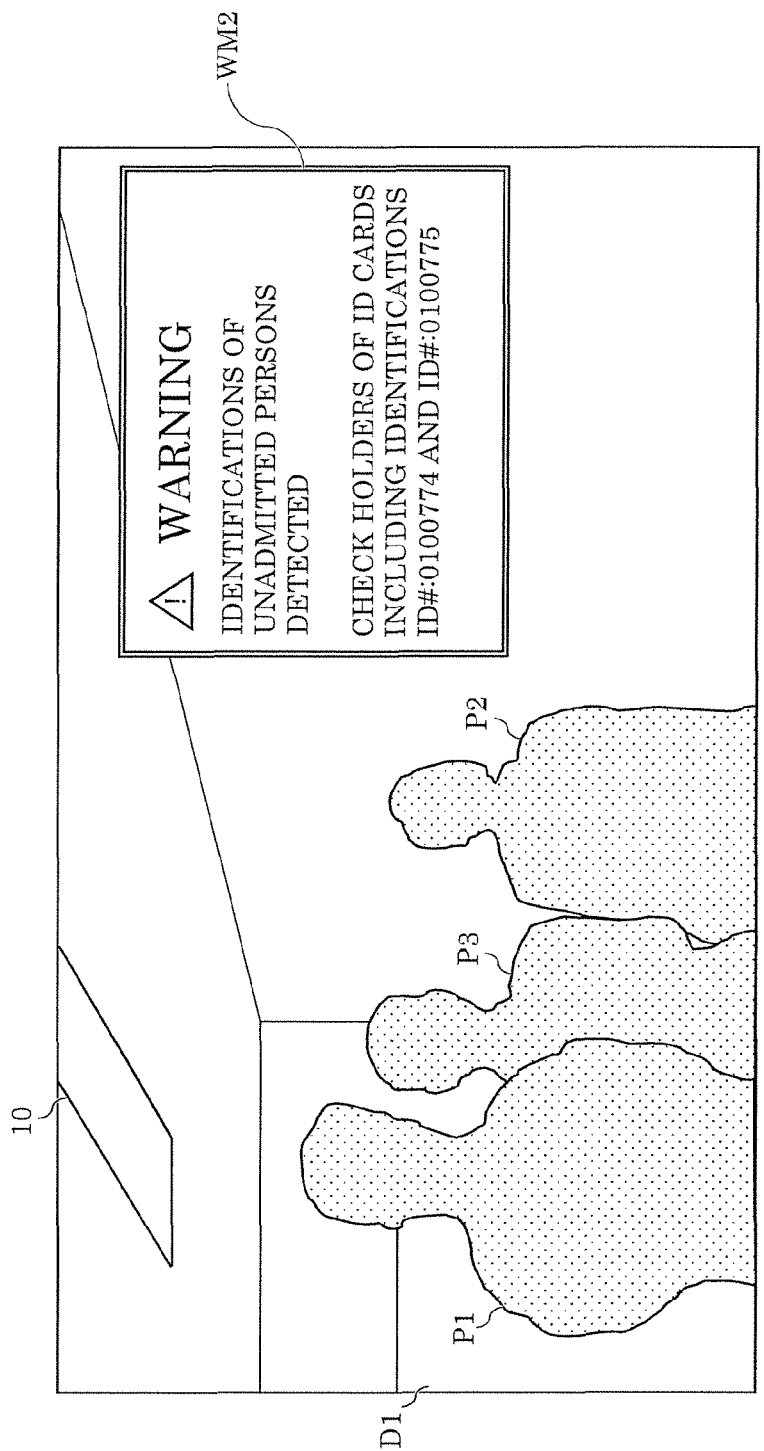

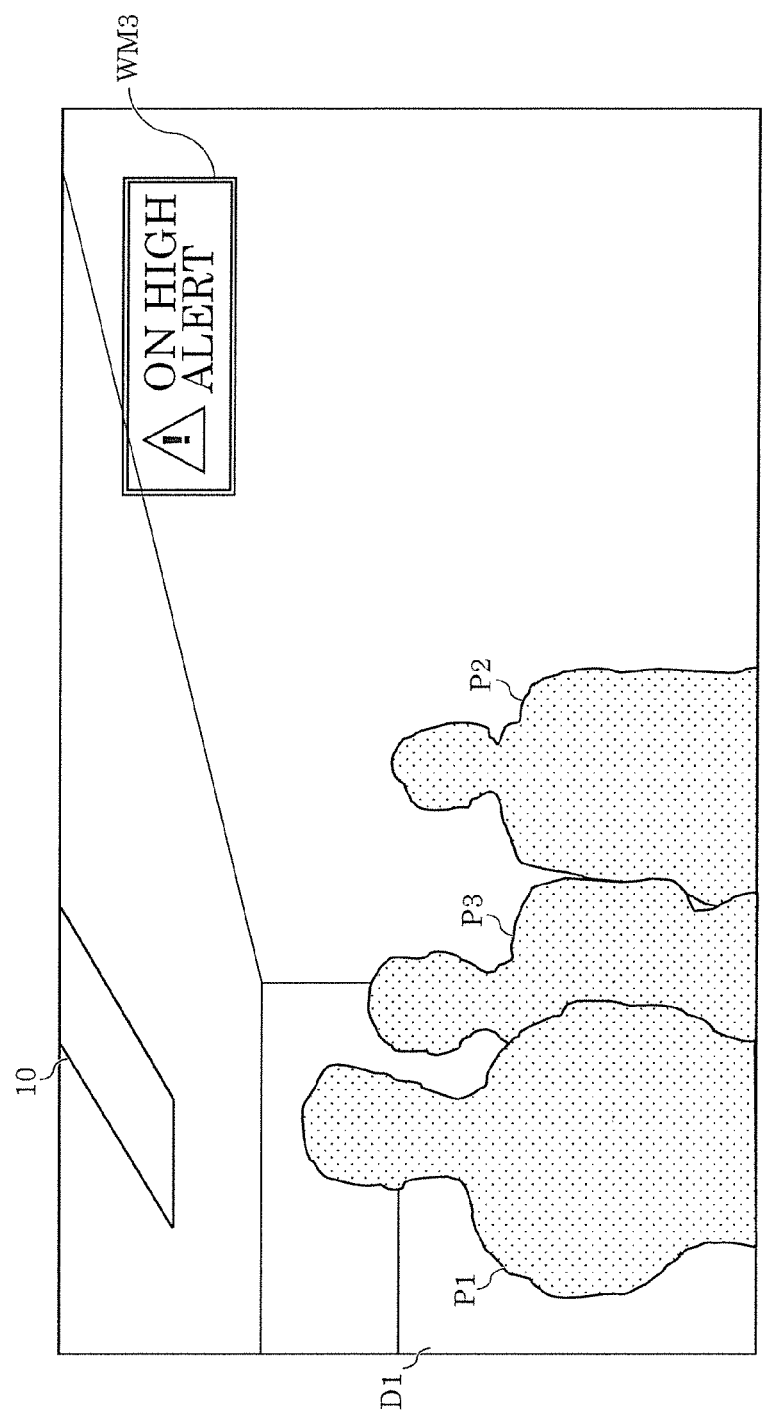

LIGHTING DEVICE AND LIGHTING SYSTEM

CROSS REFERENCE TO RELATED APPLICATION

This application claims the benefit of priority of Japanese Patent Application Number 2016-088573 filed on Apr. 26, 2016, the entire content of which is hereby incorporated by reference.

BACKGROUND

1. Technical Field

The present disclosure relates to a lighting device which illuminates a restricted place, and a lighting system including a plurality of the lighting devices.

2. Description of the Related Art

There are many restricted places such as buildings of companies, governments, and research institutes, and venues for exhibitions, sports competitions, etc. or part of the venues. To restrict entry into such places, a mechanism is used in which an identification (ID) card or pass, etc. including a radio-frequency identification (RFID) tag in which, for example, an identification is written. An example of this mechanism is a gate including a radio-frequency (RF) transmission and reception device for reading an identification written in an RF tag. This gate is normally locked to keep a person from easily passing, and is unlocked when the RF transmission and reception device receives a signal indicating an authorized identification. Moreover, Patent Literature (PTL) 1 (Japanese Unexamined Patent Application Publication No. 2015-75936) discloses a technique similar to the mechanism. According to PTL 1, an unauthorized visitation by a visitor disguising as a delivery person is detected by authenticating an identification included in an RF tag etc. held by the visitor.

SUMMARY

However, the aforementioned convention technique has the following problems.

First, it is difficult to detect an unauthorized entry or visitation by tailgating a holder of an RF tag including an authenticated identification. In addition, it is difficult to search for and track a visitor having made an unauthorized entry (hereinafter simply referred to as an intruder), depending on the extent of a place, the number of visitors at that time, or a security system, etc.

On the other hand, strengthening the security system for checking each visitor at the time of entry or monitoring after the entry increases introduction and operational costs, and may impair a convenience or atmosphere of the place.

The present disclosure provides a lighting device and a lighting system which have a function to monitor an illumination area and output information helpful to security, in addition to a function as a regular lighting device.

A lighting device according to one aspect of the present disclosure includes: a light source which is switchable between a first illumination mode and a second illumination mode to perform illumination; a human detector which detects a person in a detection area in an illumination area of the light source; an identification (ID) reader which wirelessly reads an identification stored in a radio-frequency (RF) tag in a read area of the ID reader corresponding to the detection area of the human detector; and a controller which is communicably connected to the light source, the human detector, and the ID reader, wherein the controller obtains from the human detector human detection information indicating that one or more persons are present in the detection area, obtains from the ID reader one or more identifications read by the ID reader when the human detector detects the one or more persons, and applies one mode of the first illumination mode and the second illumination mode to the light source based on the human detection information and the one or more identifications which have been obtained, and the light source performs illumination in the applied mode.

Moreover, a lighting system according to one aspect of the present disclosure includes: a first lighting device and a second lighting device, each of which is the aforementioned lighting device; and a management device which is communicably connected to the first lighting device and the second lighting device, wherein the management device obtains information indicating whether an illumination mode applied to the light source is one of the first illumination mode and the second illumination mode in each of the first lighting device and the second lighting device, and stops application of the second illumination mode to the first lighting device when application of the second illumination mode is started in the second lighting device after application of the second illumination mode to the first lighting device is started.

It is to be noted that these general and specific aspects may be realized by a system, a method, an integrated circuit, a computer program, or a computer-readable recording medium such as a CD-ROM, and may be realized by an optional combination of a system, a method, an integrated circuit, a computer program, and a recording medium.

The lighting device and the lighting system in the present disclosure monitor an illumination area and output information helpful to security, in addition to a function as a regular lighting device.

BRIEF DESCRIPTION OF DRAWINGS

The figures depict one or more implementations in accordance with the present teaching, by way of examples only, not by way of limitations. In the figures, like reference numerals refer to the same or similar elements.

FIG. 4 is a diagram illustrating an exemplary screen which displays information transmitted from the lighting device according to Embodiment 1;

FIG. 6A is a diagram illustrating an exemplary structure of data used by the lighting device according to Embodiment 1;

FIG. 6B is a diagram illustrating an exemplary structure of data used by the lighting device according to Embodiment 1;

FIG. 7 is a diagram illustrating another exemplary screen which displays information transmitted from the lighting device according to Embodiment 1;

FIG. 8 is a diagram illustrating another exemplary screen which displays information transmitted from the lighting device according to Embodiment 1;

DETAILED DESCRIPTION OF THE EMBODIMENTS

Hereinafter, a lighting device and a lighting system according to embodiments of the present disclosure will be described with reference to the drawings. Note that the embodiments described below each show a specific example of the present disclosure. The numerical values, shapes, materials, structural elements, the arrangement and connection of the structural elements, steps, the order of the steps, etc. indicated in the following embodiments are mere examples, and thus are not intended to limit the present disclosure. Therefore, among the structural elements in the following embodiments, structural elements not recited in any of the independent claims defining the most generic concept of the present disclosure are described as optional elements.

Note that the figures used in the following description are schematic diagrams and are not necessarily precise illustrations of shapes or sizes of the respective structural elements. Additionally, the same structural elements share the same reference numbers in the figures.

Embodiment 1

1. Configuration

A lighting device according to Embodiment 1 is installed in a restricted place such as an office of a company and an event site, or near a doorway to the place for which an entry restriction level is changed. As another example, the lighting device may be installed in a detached house or in the entrance hall of a housing complex or outside the door of each dwelling unit of the housing complex.

Figure 1:
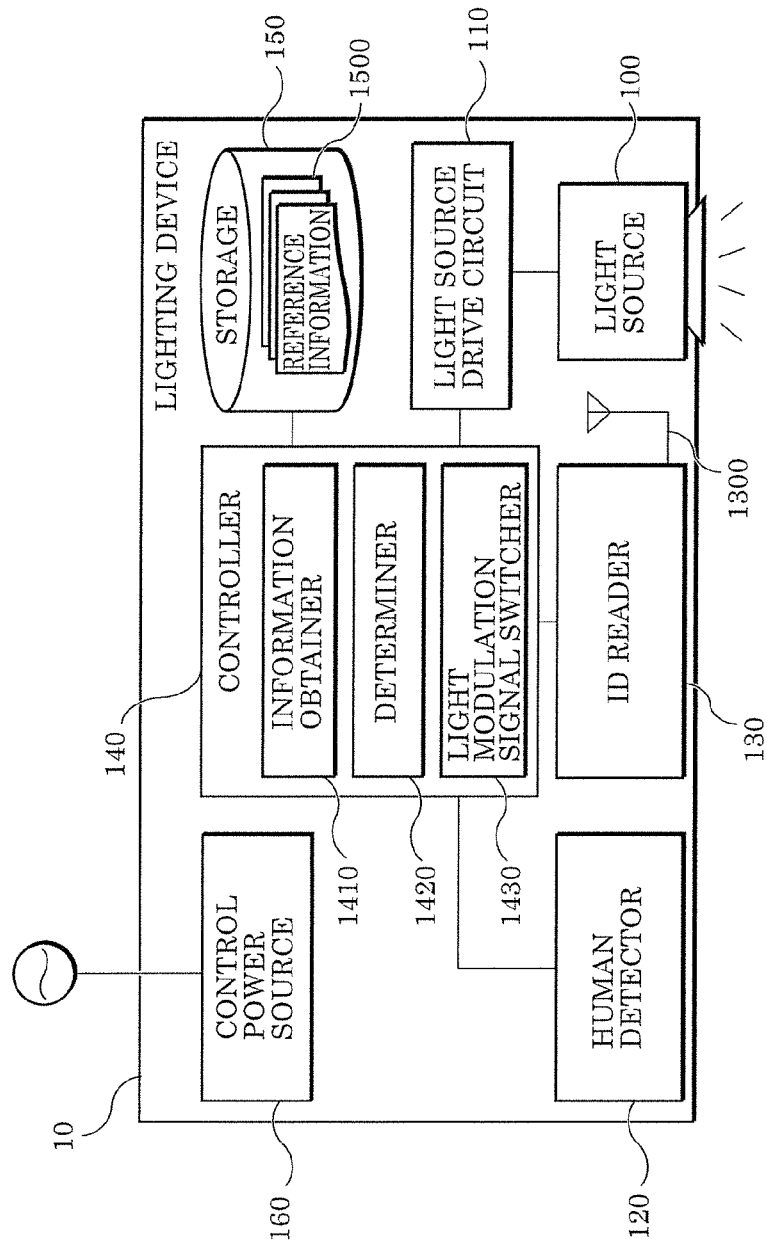
FIG. 1 is a functional block diagram illustrating a lighting device according to Embodiment 1.

FIG. 1 is a functional block diagram illustrating the lighting device according to Embodiment 1. Lighting device 10 according to Embodiment 1 includes light source 100, light source drive circuit 110, human detector 120, ID reader 130, controller 140, storage 150, and control power source 160.

Light source 100 emits light by receiving power supplied from an external power source via control power source 160 and light source drive circuit 110 which will be described below. The light is for lighting device 10 not only to illuminate surroundings thereof but also to output information. Details of the outputting of information will be described below. Although light source 100 can be implemented using, for example, a light-emitting diode, Embodiment 1 is not limited to this. Light source 100 may be any lamp that can be caused to purposely blink as in electroluminescence (EL) by pulse-width modulation (hereinafter abbreviated as PWM) etc. It is to be noted that the blinking is performed with a frequency to the extent that a person in an illumination area of light source 100 and around light source 100 can visually perceive the blinking in an aspect of Embodiment 1, and the blinking is performed with a frequency to the extent that a person cannot visually perceive the blinking in another aspect of Embodiment 1. These aspects will be described below. Moreover, light source 100 may change a color of emission light. Light source 100 may include, for example, light-emitting diodes each of which emits light of a different color, and may change a color of emission light, by changing an output ratio of the light-emitting diodes.

Light source drive circuit 110 causes light source 100 to emit light by supplying power to light source 100. Moreover, light source drive circuit 110 modulates power to be supplied to light source 100 under the control of controller 140 which will be described below. With this, light source 100 performs the aforementioned blinking.

Human detector 120 is capable of detecting a person in a detection area. For example, in a case where lighting device 10 is installed such that emission light from light source 100 illuminates a floor from above, human detector 120 detects a person in an area overlapping with at least part of an area illuminated by the emission light. The area illuminated by the emission light is hereinafter referred to as an illumination area. The area in which the person is detected by human detector 120 is hereinafter referred to as a detection area. It is to be noted that examples of the overlapping include a state in which the illumination area is larger than the detection area and includes the detection area, and a state in which the illumination area is smaller than the detection area and does not overlap with part of the detection area. Moreover, human detector 120 has optical resolution to the extent that human detector 120 detects the number of people in the detection area. Such human detector 120 is implemented using, for example, a two-dimensional infrared sensor, a visible light sensor (image sensor), or an ultrasonic sensor, or a combination of these. When detecting a person in the detection area, human detector 120 outputs to controller 140 information (human detection information) indicating the presence of the person in the detection area and the number of people.

ID reader 130 includes antenna 1300, and wirelessly reads an identification stored in an RF tag in an area corresponding to the detection area, by wireless communication via antenna 1300. The area corresponding to the detection area is hereinafter referred to as a read area. The RF tag is a passive tag embedded in an ID card given to a person admitted to a restricted place and used as an identification card such as an employee identification card and a member's card, an admission card, or a name tag, etc., for example. In a case where RF tags are in the read area, an identification stored in each of the RF tags is read. ID reader 130 transmits to controller 140 the identification read from the RF tag in the read area.

Controller 140 is implemented by a microcontroller including a processor, a memory, and input/output ports which are not shown, and controls the operation of lighting device 10. Moreover, controller 140 includes information obtainer 1410, determiner 1420, and light modulation signal switcher 1430 which are functional elements provided by executing a program stored in the memory.

Information obtainer 1410 obtains human detection information from human detector 120, and the identification read by ID reader 130 when human detector 120 obtains the human detection information.

Determiner 1420 determines a state in the detection area based on the human detection information and the identification obtained by information obtainer 1410. The determination is made for validity of the number of people (or the number of RF tags) in the detection area indicated by the human detection information, appropriateness of the person being in the detection area indicated by the identification, and security required for people in the detection area. Details of these will be described below. Moreover, determiner 1420 selects an illumination mode based on the determination, and applies the illumination mode to light source 100. The illumination mode is an illumination pattern of light source 100. By changing the illumination mode to be applied, for example, the luminance of light source 100, the color of emission light, or the presence or absence, or a rate, of blinking is changed, for example. The illumination mode will be specifically described using an example in description of operation below.

Light modulation signal switcher 1430 outputs a control signal for controlling light source drive circuit 110. The controlling is performed based on the determination made by determiner 1420, and light source drive circuit 110 modulates power to be supplied to light source 100, according to the controlling. Moreover, light modulation signal switcher 1430 changes a pattern of the modulation to change the luminance of light source 100, the color of emission light, or the presence or absence, or a rate, of blinking. In other words, light modulation signal switcher 1430 causes light source 100 to perform illumination in the illumination mode applied based on the determination made by determiner 1420.

Storage 150 is a storage device implemented using a semiconductor memory such as a flash memory or a read-only memory (ROM), etc., and holds information (hereinafter also referred to as reference information 1500) referenced as necessary by determiner 1420 to select the illumination mode.

By transforming, rectifying, smoothing, etc. power obtained from a power source (alternating-current power source in the example shown in FIG. 1) outside of lighting device 10 such as a commercial power source, control power source 160 converts the power into power suitable for use by each of the structural elements included in lighting device 10 and supplies the converted power. It is to be noted that a line indicating a connection between control power source 160 and each structural element is omitted from FIG. 1 for visibility.

It is to be noted that the above description is an example, and the configuration of lighting device 10 according to Embodiment 1 is not limited to the example. For example, lighting device 10 may include a communication module for communicating with an external device via a wired or wireless connection. In this case, storage 150 is not included in lighting device 10, and may be included as a storage device in an external device communicable with lighting device 10 via a wired or wireless connection, such as a server or a gateway in a network. In this case, controller 140 may access to the reference information by communicating with the external device via the communication module.

Moreover, light source 100, human detector 120, and ID reader 130 each may be implemented by devices of the same kind or different kinds. For example, light source 100 may be implemented by illuminating lamps, and some of the illuminating lamps may emit light of a different color from the color of light emitted by the remaining of the illuminating lamps. Furthermore, human detector 120 may be implemented by sensors to ensure a detection area having desired extent or may be implemented by a combination of the infrared sensor and the ultrasonic sensor as described above. Moreover, ID reader 130 may include antennas having high directivity or ID readers to ensure a read area corresponding to the detection area.

The following describes the operation of lighting device 10 thus configured, using an example. It is to be noted that in the following description of the operation of lighting device 10, the operation of information obtainer 1410, determiner 1420, and light modulation signal switcher 1430 may be described as the operation of controller 140 for the sake of simplicity.

2. Exemplary Operation 1

Figure 2A:
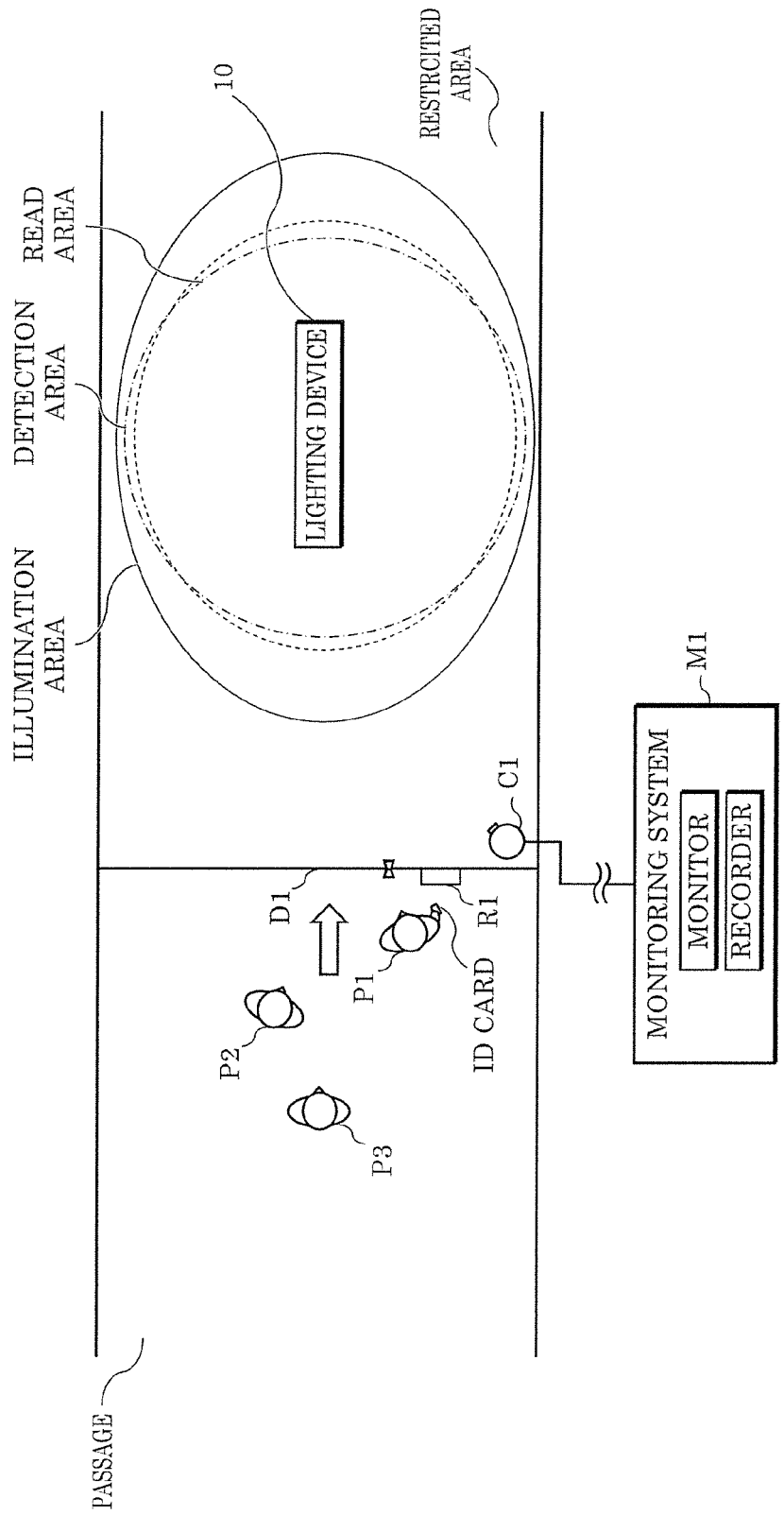
FIG. 2A is a plan view illustrating a hypothetical situation for describing exemplary operation of the lighting device according to Embodiment 1.
Figure 2B:
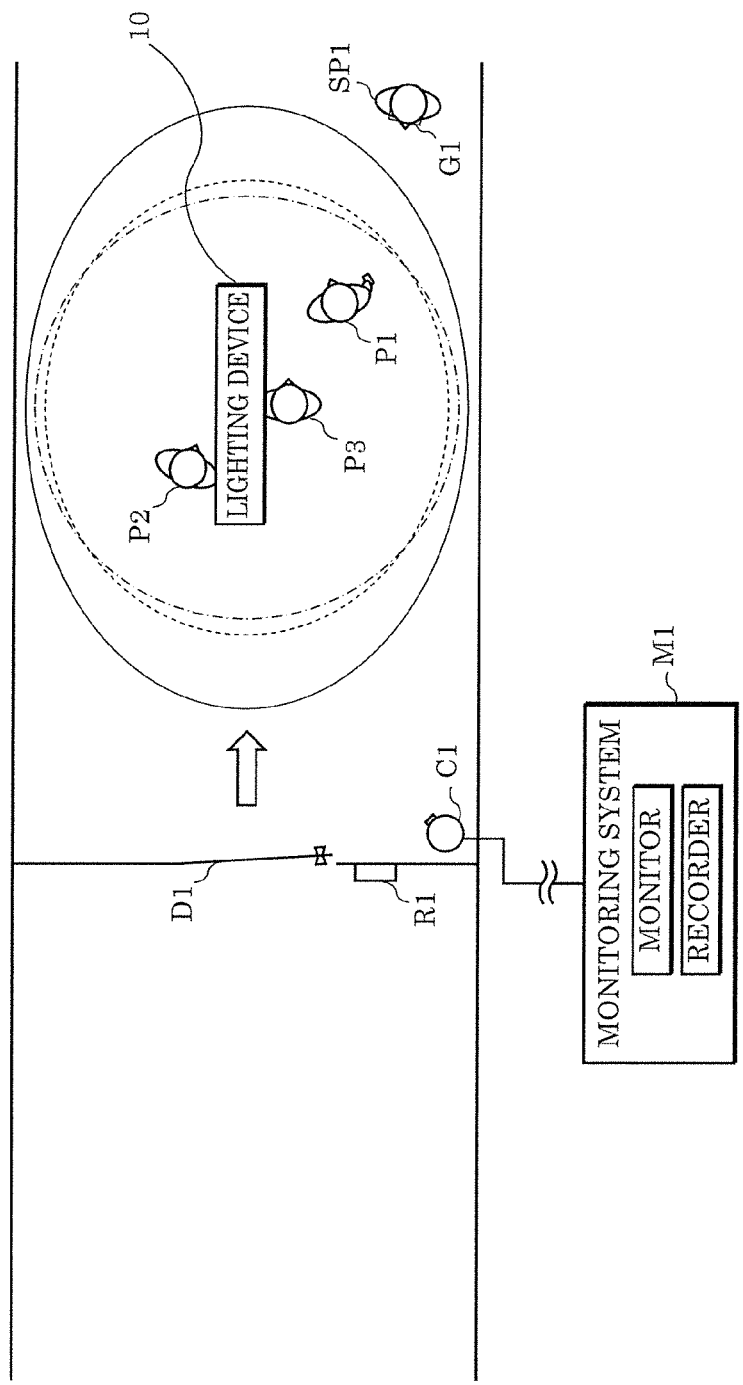
FIG. 2B is a plan view illustrating a hypothetical situation for describing exemplary operation of the lighting device according to Embodiment 1.

FIG. 2A and FIG. 2B each are a plan view illustrating a hypothetical situation for describing exemplary operation 1 of lighting device 10.

FIG. 2A and FIG. 2B each show a situation in which lighting device 10 is installed as a lighting device illuminating from a ceiling the vicinity of a doorway for a restricted area, in a passage in which beyond door D1 (the right side of the figure) is the restricted area. Among ellipses around lighting device 10, a solid ellipse represents an illumination area which is illuminated at a certain or higher luminance level with emission light of light source 100 included in lighting device 10. Moreover, a doted-and-dashed ellipse represents an outline, on a floor, of a detection area of human detector 120, and a dashed ellipse represents an outline, on the floor, of a read area of ID reader 130. As stated above, the detection area and the read area which correspond to each other are used. It is to be noted that the illumination area, the detection area, and the read area each extend in at least part of a space between lighting device 10 and the floor. The following describes exemplary operation 1 using the outlines, on the floor, of these areas in a plan view for the sake of convenience, but can also be applied to the areas extending three-dimensionally. In addition, the shapes, sizes, and arrangement of the areas and lighting device 10 are not limited to the example shown in the figure.

In the example, it is assumed that every person in the restricted area is required to carry an ID card including an RF tag. Accordingly, the number of people entering the restricted area and the number of ID cards (RF tags) match in principle. Moreover, it is assumed that a visitor enters the restricted area by having reader R1 read information written in the RF tag to unlock door D1. FIG. 2A shows a situation before persons P1 to P3 enter the restricted area. In this situation, at least person P1 has the ID card. FIG. 2B shows a situation in which persons P1 to P3 have entered the restricted area after door D1 was unlocked. An arrow in each of the figures indicates a moving direction of persons P1 to P3.

Figure 3:
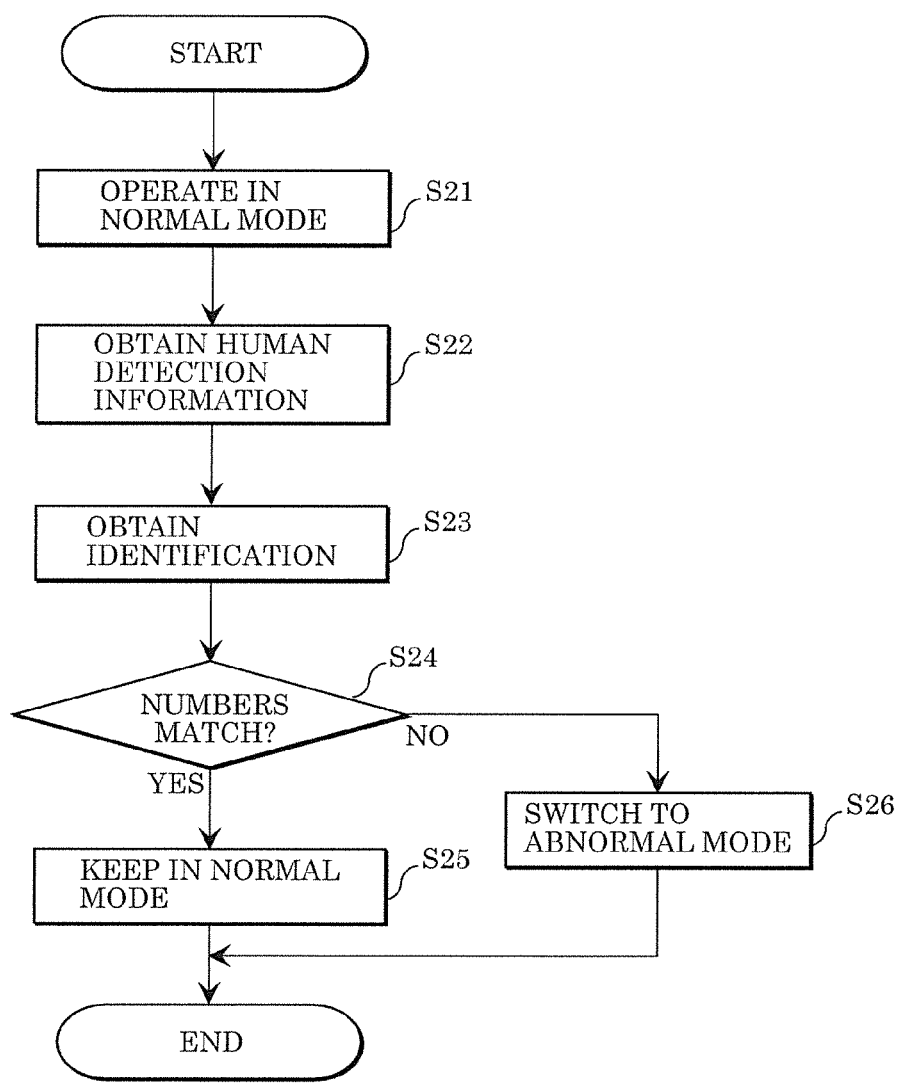
FIG. 3 is a flow chart illustrating a procedure for exemplary operation of the lighting device according to Embodiment 1.

FIG. 3 is a flow chart illustrating a procedure for exemplary operation 1 of lighting device 10.

First, light source 100 emits light by lighting device 10 starting to operate. In this case, controller 140 applies to light source 100 a normal mode which is one of the illumination modes (step S21). The normal mode is an example of a first illumination mode in Embodiment 1. While the normal mode is applied to light source 100, lighting device 10 illuminates the illumination area with the emission light of light source 100 in a generic illumination pattern such as a pattern in which light source 100 emits white light without blinking with a human-perceivable frequency. Alternatively, lighting device 10 performs illumination in the same illumination pattern as a lighting device installed in a non-restricted area short of door D1 (the left side of the figure). FIG. 2A shows such a situation.

Next, as illustrated in FIG. 2B, persons P1 to P3 go into the restricted area and enter the detection area. Subsequently, human detector 120 detects the three persons in the detection area, and controller 140 obtains from human detector 120 human detection information indicating that the three persons are detected (step S22).

Controller 140 having obtained the human detection information causes ID reader 130 to read the identification written in the RF tag in the read area upon the obtaining, and obtains the identification from ID reader 130 (step S23).

Next, controller 140 determines whether the number of people in the detection area indicated by the human detection information obtained in step S22 and the number of identifications obtained in step S23 match (step S24). Step S24 is a type of determination for a state in the detection area made by determiner 1420, and is determination for validity of the number of people (or the number of RF tags) in the detection area indicated by the human detection information.

It is to be noted that to ensure accuracy of the determination for the validity, the detection area and the read area which correspond to each other are used as stated above. The correspondence between the detection area and the read area in the present disclosure indicates not only the outline, on the floor, of each area as illustrated in FIG. 2A and FIG. 2B but also a predetermined degree of three-dimensional overlapping in a space including a detection object between lighting device 10 and the floor. The predetermined degree is not limited to complete overlapping of the detection area and the read area, and includes overlapping of the detection area and the read area whose positions and sizes are adjusted to avoid missing reading the identification of an RF tag in the detection area or reading an identification from an RF tag outside the detection area as much as possible. For example, the predetermined degree is at least 80% or more desirably at least 90% in terms of the proportion of overlapping between the detection area and the read area with respect to the sum of the detection area and the read area. A magnitude relation between the detection area and the read area which partially overlap with each other does not matter, and one of the detection area and the read area may be included in the other of the detection area and the read area.

In a case where a result of the determination in step S24 indicates "matching" (YES in step S24), controller 140 keeps light source 100 in the normal mode (step S25). Accordingly, light source 100 does not change the illumination pattern, and persons P1 to P3 can further step forward in the restricted area without being stopped by security guard SP1.

In a case where a result of the determination in step S24 indicates "mismatching" (NO in step S24), controller 140 switches the illumination mode applied to light source 100 to an abnormal mode (step S26). With this, light source 100 changes the illumination pattern. By light source 100 performing illumination in the abnormal mode, lighting device 10 transmits information about security in the illumination area. The abnormal mode is an example of a second illumination mode in Embodiment 1. Exemplary illumination patterns of lighting source 100 in the abnormal mode will be described below.

Example 1: Illumination with Emission Light of a Different Luminance or Color than in the Normal Mode, or Unperceivable Blinking For example, in a case where security guard SP1 is positioned in the vicinity of the doorway, security guard SP1 obtains information that an entry of persons P1 to P3 is suspicious for security reasons, by looking at a scene in which light source 100 operates in the illumination pattern. In addition, persons P1 to P3 can understand that the unauthorized entry of themselves is detected or there is something wrong (e.g., carrying no ID card with themselves).

Moreover, the scene in which light source 100 operates in the illumination pattern may be transmitted as an image to monitoring system M1 etc. outside of lighting device 10 via monitoring camera C1 installed in the restricted area. Monitoring system M1 displays the scene on a monitor or records the scene on a recorder, for example.

Example 2: Transmission of Light ID (Visible Light Communication)

By causing light source 100 to operate for visible light communication by blinking with a high modulation frequency or in a tiny area which a person has difficulty perceiving or cannot perceive, light source 100 may be caused to transmit the information about security in the illumination area using a light ID (an abbreviation for a light identifier). The light ID is transmitted through visible light communication; indicates information such as a detected situation, a detected person, or a message like an instruction for a security guard which corresponds to the detected situation; and is obtained by coding such information according to predetermined rules. In this case, it is possible to transmit more detailed information than in Example 1. The information is received by monitoring system M1 via monitoring camera C1 or special eyeglasses G1 worn by security guard SP1, for example. Eyeglasses G1 are what is called smart glasses, include a light sensor, and are installed with application software for obtaining information by decoding a light ID detected by the light sensor. Eyeglasses G1 display the obtained information to the wearer. FIG. 4 is a diagram illustrating an exemplary screen of the monitor of monitoring system M1 or eyeglasses G1 which displays information transmitted from lighting device 10. In this example, warning message WM1 is displayed superimposed on an actual scene in which persons P1 to P3 are under lighting device 10 after entering the restricted area through door D1. Security guard SP1 can take action based on information shown in message WM1. In addition, monitoring system M1 is installed with the application software for decoding a light ID. Information obtained by decoding a light ID received via monitoring camera C1 is displayed on the monitor as illustrated in FIG. 4 or recorded on the recorder together with images captured by monitoring camera C1, for example.

Although the message on the screen is displayed in the abnormal mode in the above example, a pattern of displaying information through visible light communication is not limited to this. For example, information indicating that there is no abnormality may be displayed in the normal mode. In addition, a signal transmitted through visible light communication may include an audio signal, and such information may be presented to security guard SP1 in audio as indicated by the audio signal via an earphone connected to eyeglasses G1, for example.

Such operation of Example 2 may be executed in combination with Example 1. It is to be noted that in a case where only Example 2 is executed, persons P1 to P3 cannot understand that the unauthorized entry of themselves is detected or there is something wrong until persons P1 to P3 are informed by the action etc. of security guard SP1.

Moreover, the application of the abnormal mode may be continued until the abnormal mode is switched to the normal mode by the operation of security guard SP1 having confirmed safety, or the application of the abnormal mode may be discontinued at a time set by a user of lighting device 10 such as a head of security, and the abnormal mode may be automatically switched to the normal mode.

As just described, in exemplary operation 1, lighting device 10 makes the determination regarding the security in the detection area based on whether the number of people in the detection area indicated by the human detection information and the number of identifications match. As a specific example of the determination, in a case where the number of people in the detection area indicated by the human detection information is greater than the number of identifications, it is determined that tailgating has occurred. In addition, in a case where the number of people in the detection area indicated by the human detection information is less than the number of identifications, it is determined that an ID card has fraudulently been carried in. The security guard or the person in question having made the entry can be informed of this situation by switching the illumination mode.

3. Exemplary Operation 2

Exemplary operation 2 will be described using the hypothetical situations for describing exemplary operation 1 and illustrated in FIG. 2A and FIG. 2B.

In exemplary operation 2, controller 140 checks contents of an identification obtained from ID reader 130 against reference information 1500 stored in storage 150, and applies one of the illumination modes to light source 100 based on a result of the checking.

Figure 5A:
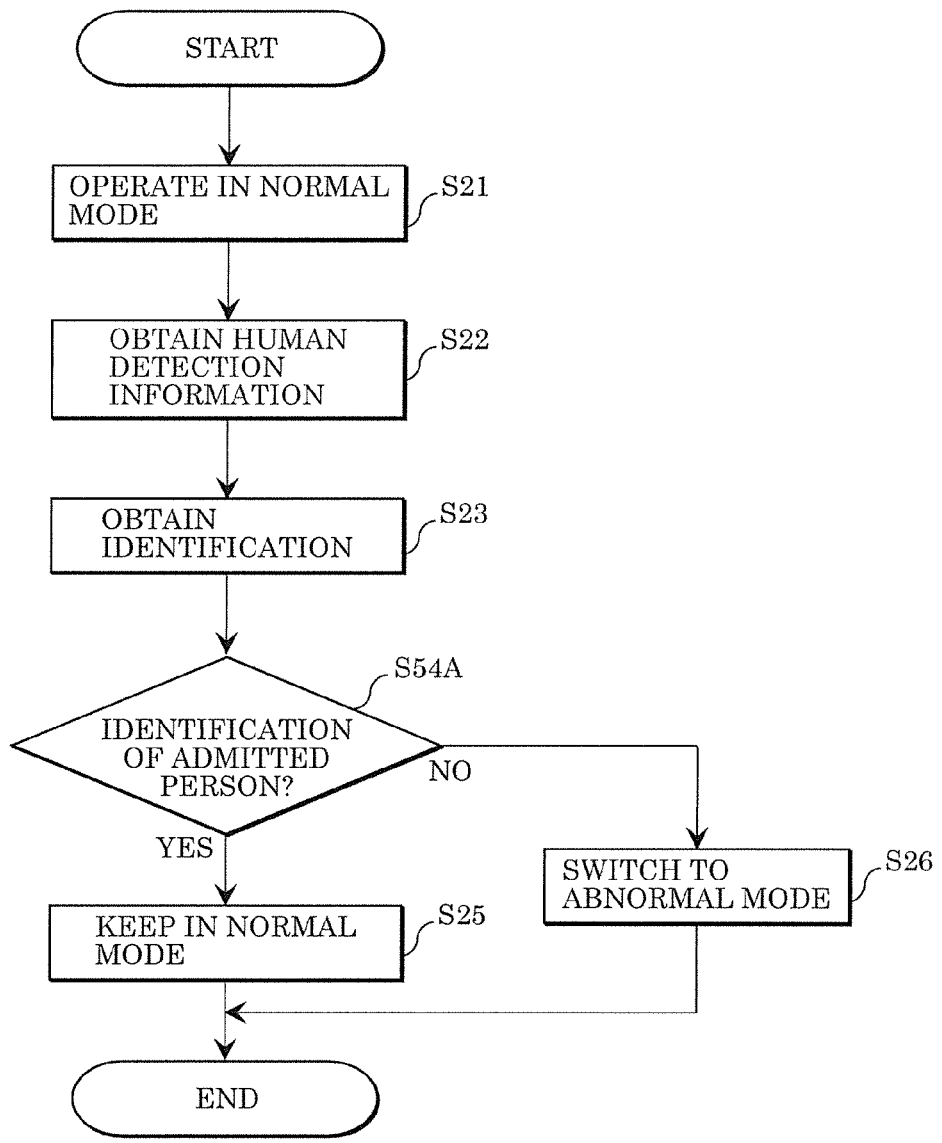
FIG. 5A is a flow chart illustrating another procedure for exemplary operation of the lighting device according to Embodiment 1.
Figure 5B:
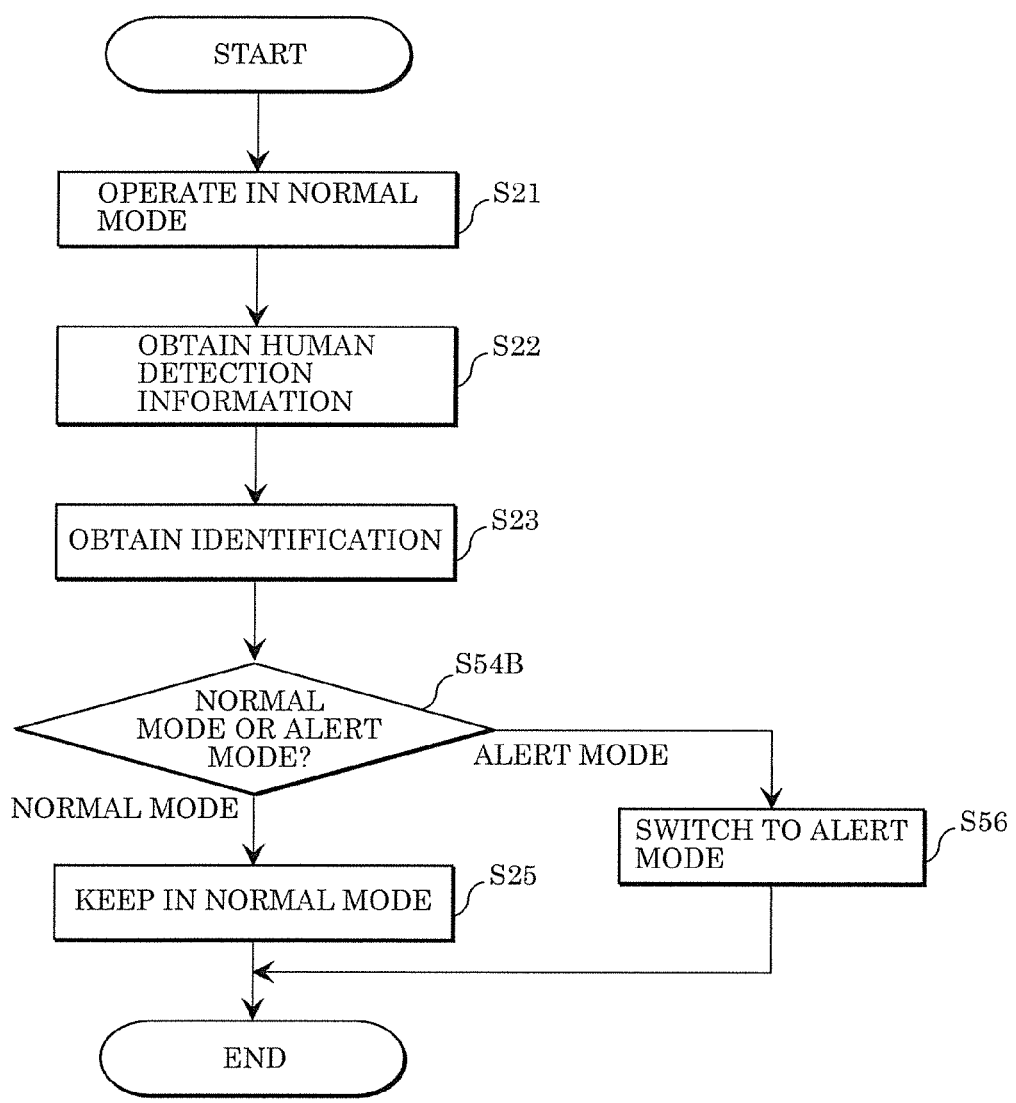
FIG. 5B is a flow chart illustrating another procedure for exemplary operation of the lighting device according to Embodiment 1.

FIG. 5A and FIG. 5B each are a flow chart illustrating a procedure for exemplary operation 2 of lighting device 10. It is to be noted that the same steps as in exemplary operation 1 are referred to by the same reference signs in the flow charts of FIG. 5A and FIG. 5B, and will be briefly described below.

First, light source 100 emits light by lighting device 10 starting to operate. In this case, controller 140 applies to light source 100 the normal mode which is one of the illumination modes (step S21). FIG. 2A shows such a situation.

Next, as illustrated in FIG. 2B, persons P1 to P3 go into the restricted area and enter the detection area. Subsequently, human detector 120 detects the three persons in the detection area, and controller 140 obtains from human detector 120 the human detection information indicating that the three persons are detected (step S22).

Controller 140 having obtained the human detection information causes ID reader 130 to read the identification written in the RF tag in the read area upon the obtaining, and obtains the identification from ID reader 130 (step S23).

Next, controller 140 determines whether the identification obtained in step S23 is information of a person admitted to the restricted area (step S54A). Step S54A is a type of determination for a state in the detection area made by determiner 1420, and is specifically determination for appropriateness of the person being in the detection area indicated by the identification. To make the determination, controller 140 accesses reference information 1500 stored in storage 150. FIG. 6A illustrates reference information 1500A which is an example of reference information 1500.

Reference information 1500A indicates identification numbers included in identifications and the presence or absence of admission to the restricted area illustrated in FIG. 2A and FIG. 2B in association with each other. For example, a person indicated by identification number "0100773" is admitted to the restricted area, and value "1" indicating this is in the same row as the identification number. In the next row, a person indicated by identification number "0100774" is not admitted to the restricted area, and value "0" indicating this is in the cell on the right of the identification number.

For example, in a case where the identification obtained in step S23 indicates identification number "0100773," controller 140 determines that the identification is the identification of the admitted person, by reference to reference information 1500A (YES in step S54A). Subsequently, controller 140 keeps light source 100 in the normal mode (step S25). For example, in a case where the identification obtained in step S23 indicates identification number "0100774," controller 140 determines that the identification is the identification of the unadmitted person, by reference to reference information 1500A (NO in step S54A). Subsequently, controller 140 switches the illumination mode applied to light source 100 to the abnormal mode (step S26). With this, light source 100 changes the illumination pattern. By light source 100 performing illumination in the abnormal mode, lighting device 10 transmits information about security in the illumination area.

The illumination pattern in each illumination mode is almost the same as in exemplary operation 1, and a message displayed in the case of the illumination pattern in Example 2 is changed appropriately. For example, in a case where persons P1 to P3 make their entry with respective ID cards including identifications indicating identification numbers 0100773, 0100774, and 0100775, message WM2 shown in an example of FIG. 7 may be displayed in the monitor of eyeglasses G1 or monitoring system M1.

It is to be noted that even in a case where multiple people simultaneously enter the restricted area, the determination in step S54A is made for each of identifications of ID cards held by the respective people. However, the RF tags in the read area are almost simultaneously read by ID reader 130. After the determination in step S54A is made for the identifications of the ID cards held by all people in the read area by taking advantage of such characteristics of an RF tag system, a result of the determination may be displayed at a time as in the example of FIG. 7. In this manner, for example, in a case where a group makes an unauthorized entry, it is easy to simultaneously stop people highly likely to be involved in the unauthorized entry.

Moreover, in the above description, reference information 1500A, which is the example of reference information 1500, indicates each identification and the presence or absence of admission in association with each other, and controller 140 switches the illumination mode to be applied, based on the presence or absence of admission. In other words, reference information 1500A indirectly indicates associations between the identifications and the illumination modes. Reference information 1500 is not limited to this data format, and may indicate, for example, each identification and one of the illumination modes to be applied, in direct association with each other. FIG. 6B illustrates reference information 1500B which is another example of reference information 1500.

Reference information 1500B indicates each of identification numbers included in identifications and one of two illumination modes, the normal mode and an alert mode, in association with each other. As stated above, the normal mode is the example of the first illumination mode in Embodiment 1. The alert mode is the example of the second illumination mode in Embodiment 1. In the alert mode, light source 100 may transmit, to eyeglasses G1 of a nearby security guard, information including an instruction to raise an alert level using a light ID, and the information may be displayed as in FIG. 8. It is to be noted that an illumination pattern of light source 100 in the alert mode is not limited to an illumination pattern for information transmission using such a light ID. For example, for ease of security, light source 100 may have a higher luminance in the alert mode than in the normal mode.

Exemplary operation in this case will be described with reference to the flow chart of FIG. 5B. For example, identification numbers "0000341" and "0000342" are included in identifications written in RF tags included in ID cards held by very important persons or their attendants. When a very important person etc. having an ID card enters the read area of lighting device 10, controller 140 obtains an identification from ID reader 130 (step S23). The operation thus far is the same as the exemplary operation illustrated in the flow chart of FIG. 5A.

Next, by reference to reference information 1500B, controller 140 determines that an illumination mode associated with the identification number included in the obtained identification is the alert mode ("ALERT MODE" in step S54B). Subsequently, controller 140 switches the illumination mode applied to light source 100 from the normal mode to the abnormal mode (step S56).

Moreover, reference information 1500 may be provided in a blacklist format or a whitelist format. As an exemplary operation using reference information 1500 in the blacklist format, only in a case where an obtained identification is included in reference information 1500, the illumination mode is switched from the normal mode to another illumination mode. As an exemplary operation using reference information 1500 in the whitelist format, in a case where an obtained identification is not included in reference information 1500, the illumination mode is always switched from the normal mode to another illumination mode.

Such reference information 1500 is an example of illumination mode determination information in Embodiment 1.

4. Other Exemplary Operation

Figure 9:
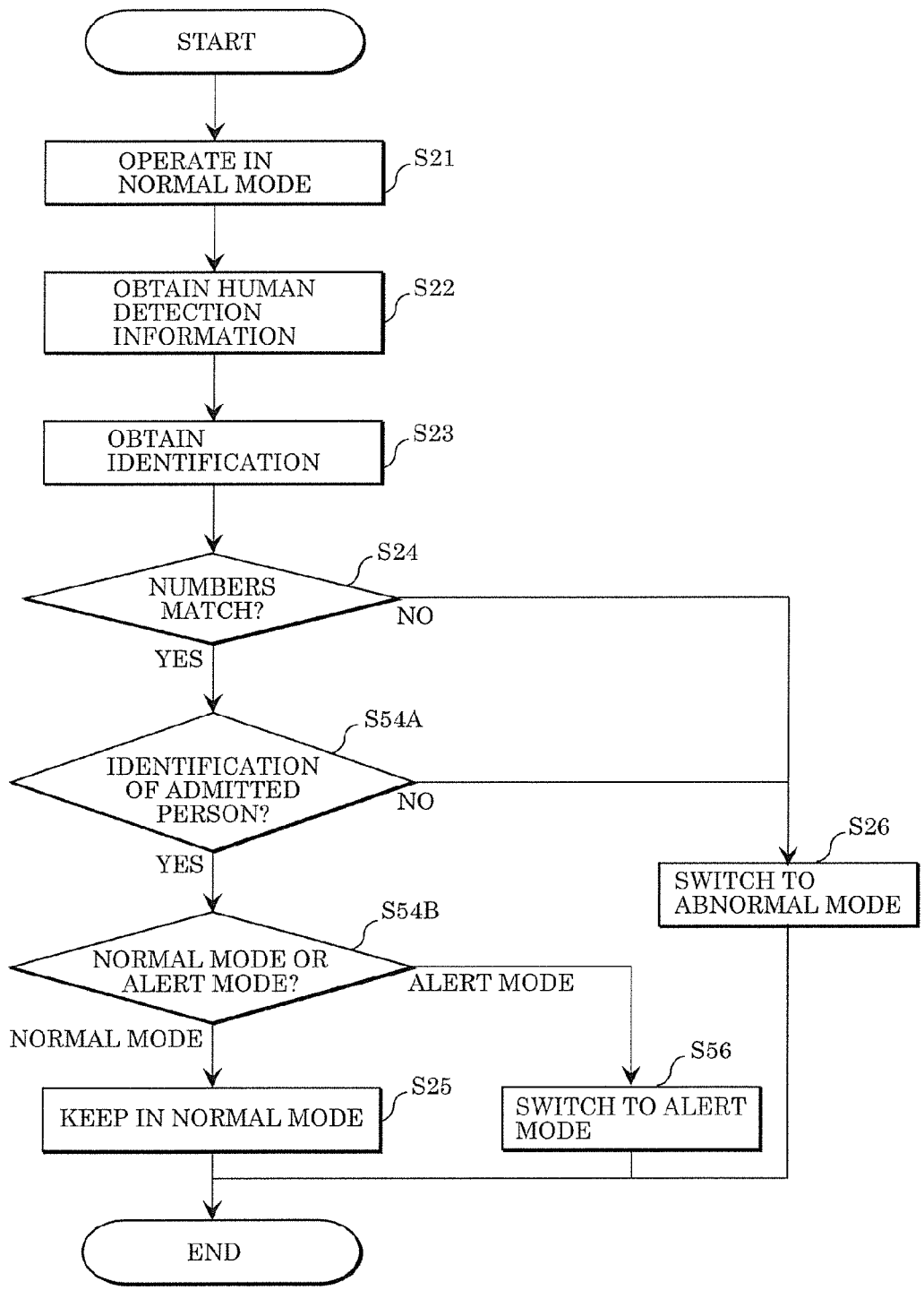
FIG. 9 is a flow chart illustrating another procedure for exemplary operation of the lighting device according to Embodiment 1.

Exemplary operation 1 and exemplary operation 2 described above may be combined. FIG. 9 is a flow chart illustrating exemplary operation of lighting device 10 in a case where exemplary operation 1 and exemplary operation 2 are combined. Each step is the same as the one described above, and thus a detailed description thereof is omitted.

According to the operation, it is determined whether the number of people detected and the number of identifications read at almost the same time as the detection match (step S24).

In the case of YES in step S24, it is determined whether a read identification is the identification of an admitted person (step S54A).

In the case of NO up to the step, the illumination mode is switched to the abnormal mode (step S26).

In the case of YES in step S54A, an illumination mode is determined which is applied in a case where the person having the identification is present (step S54B). Light source 100 operates in the normal mode (step S25) or the alert mode (step S56) according to a result of the determination.

It is to be noted that the aforementioned operation is an example of the combination of exemplary operation 1 and exemplary operation 2. Step S24 or one of step S54A and step S54B may be omitted, or execution sequence of these steps may be changed, in accordance with security policy applied to a place in which lighting device 10 is used.

5. Other Exemplary Configurations

As stated above, to appropriately determine whether the number of people in the detection area and the number of identifications in the read area match, the detection area and the read area which correspond to each other are used.

Figure 10A:
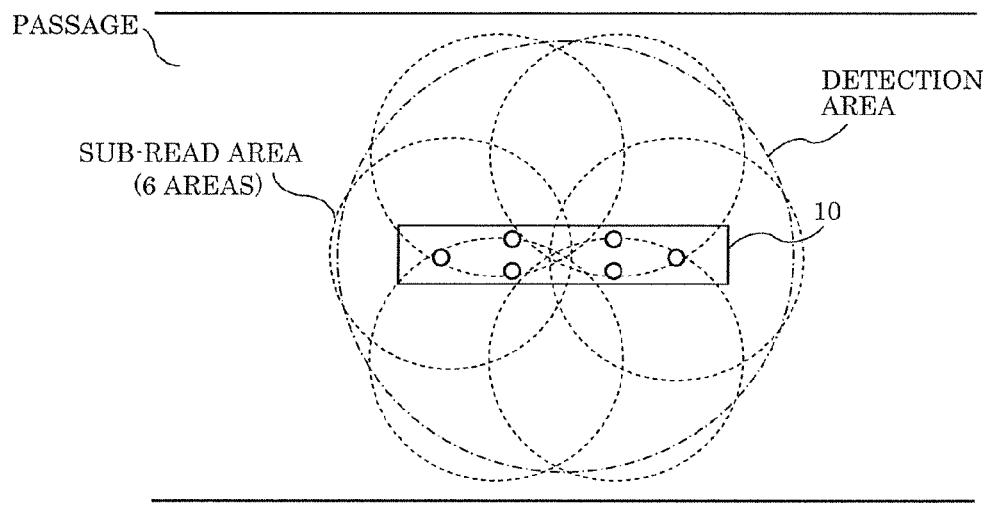
FIG. 10A is a diagram illustrating an exemplary positional relationship between a detection area and read areas in a configuration of the lighting device according to Embodiment 1.

To ensure the detection area and the read area corresponding to each other, the detection area of human detector 120 or the read area of ID reader 130 may be adjustable in size (sensitivity). Moreover, for example, as stated above, ID reader 130 may include the antennas having high directivity or two or more ID readers having high directivity. The high directivity means that a read area (hereinafter referred to as a sub-read area) of each of the antennas or the ID readers is smaller than the detection area. The antennas or the ID readers may be arranged such that a set of the read areas covers the substantial whole of the detection area and the outline of a large read area which is the set corresponds to the outline of the detection area. FIG. 10A schematically illustrates an example of a detection area and a set of sub-read areas, in a plan view, of lighting device 10 which emits light from the ceiling of a passage toward a floor as illustrated in FIG. 2A and FIG. 2B. A read area includes a set of six sub-read areas indicated by dashed circles. In addition, open circles on lighting device 10 indicate exemplary positions of six ID readers included in ID reader 130. It is to be noted that the number and positions of the ID readers included in ID reader 130 and the shape, number, and positions of the sub-read areas are not limited to the example illustrated in the figure.

Moreover, each of the antennas or ID readers can be changed in orientation or position, and the read area which is the set may be adjusted in position by moving the sub-read areas by changing the ID readers in orientation or position. Furthermore, each antenna or ID reader can be changed in sensitivity, and the sub-read areas may be adjusted in size by changing the sensitivity.

It is to be noted that human detector 120 may include human detectors, and a detection area may be a set of detection areas of the respective human detectors. Each of the human detectors can be changed in orientation or position. In addition, each human detector can be changed in sensitivity, and the detection area may be adjusted in size by changing the sensitivity.

According to this configuration, it is easier to obtain the read area corresponding to the detection area of human detector 120.

Figure 10B:
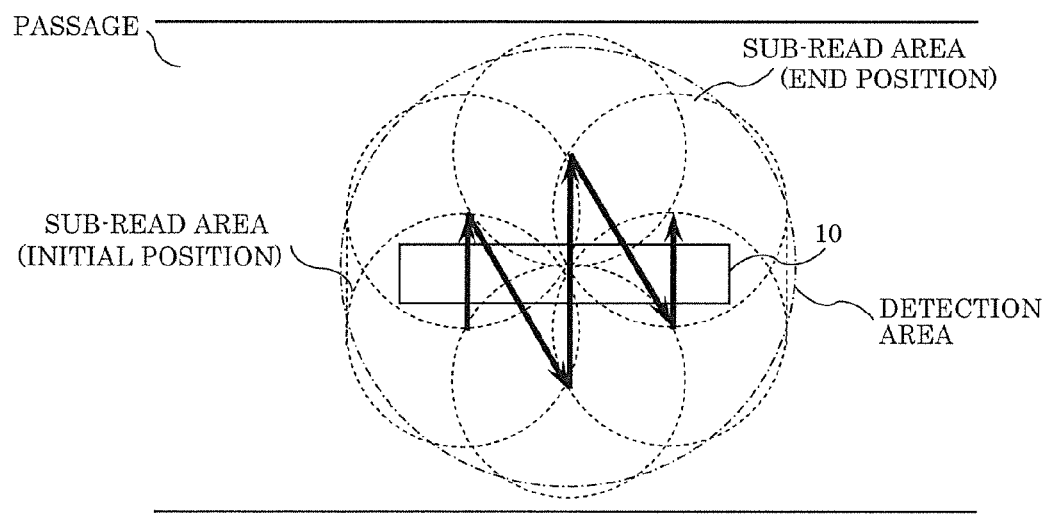
FIG. 10B is a diagram illustrating an exemplary positional relationship between a detection area and read areas in another configuration of the lighting device according to Embodiment 1.

Alternatively, ID reader 130 may be at least one aforementioned ID reader having high directivity, and may be configured to be capable of scanning a detection area with the sub-read area of the ID reader. A read area in this case is a continuous trajectory of a sub-read area swept in a space by the ID reader. FIG. 10B illustrates, in a plan view, an exemplary motion path, on a floor, of one sub-read area in a case where a detection area is scanned with the one sub-read area by lighting device 10 which emits light from the ceiling of a passage toward the floor as illustrated in FIG. 2A and FIG. 2B. Arrows in the figure schematically show the exemplary motion path. Moreover, dashed circles in the figure indicate representative positions of the sub-read area on the motion path. In addition, the outer edge of the trajectory of the sub-read area corresponds to the outline of the read area of ID reader 130. The number of ID readers included in ID reader 130, the shape, position, and motion path of the sub-read area, and the number of sub-read areas are not limited to the example illustrated in the figure.

The ID reader can be changed in manner of moving, and the outline of the read area may be adjusted by changing the motion path of the sub-read area by changing the ID reader in manner of moving.

According to this configuration, it is also easier to obtain the read area corresponding to the detection area of human detector 120.

6. Advantageous Effects Etc.

Lighting device 10 according to Embodiment 1 includes: light source 100 which is switchable between a first illumination mode and a second illumination mode to perform illumination; human detector 120; ID reader 130; and controller 140 which is communicably connected to light source 100, human detector 120, and ID reader 130.

Human detector 120 detects a person in a detection area in an illumination area of light source 100.

ID reader 130 wirelessly reads an identification stored in at least one RF tag in a read area of ID reader 130 corresponding to the detection area of human detector 120.

Controller 140 obtains from human detector 120 human detection information indicating that one or more persons are present in the detection area. Moreover, controller 140 obtains from ID reader 130 one or more identifications read by ID reader 130 when human detector 120 detects the one or more persons in the detection area. Furthermore, controller 140 applies one mode of the first illumination mode and the second illumination mode to light source 100 based on the human detection information and the one or more identifications which have been obtained. Light source 100 performs illumination in the applied mode.

With this, lighting device 10 monitors a predetermined area using a result of detection of a person in the predetermined area and a result of reading of an RF tag immediately performed upon the detection. Lighting device 10 makes it possible to change an illumination pattern according to a result of the monitoring.

More specifically, for example, the human detection information further indicates a total number of the one or more persons in the detection area. Controller 140 applies the first illumination mode to light source 100 in a case where the total number of the one or more persons indicated by the human detection information and a total number of the one or more identifications match, and applies the second illumination mode to light source 100 in a case where the total number of the one or more persons indicated by the human detection information and the total number of the one or more identifications mismatch.

With this, lighting device 10 detects a person not admitted to a specific place or fraudulent carrying-in of an ID card etc., based on the mismatch between the actual number of people and the number of ID cards etc. When detecting such a thing, lighting device 10 makes it possible to change an illumination pattern. Moreover, as long as the detection area accommodates people, lighting device 10 makes it possible to almost simultaneously check everyone for such a fraud and to detect tailgating. Accordingly, it is possible to conduct a more smooth security check on visitors without sacrificing a security level. In addition, because the multiple people are simultaneously checked, it is easy to catch people involved in tailgating. This also leads to maintain or increase the security level.

Moreover, controller 140 may further be communicably connected to storage 150 which stores illumination mode determination information indicating an association between each of the one or more identifications and one of the first illumination mode and the second illumination mode. When obtaining the one or more identifications, controller 140 may apply one of the first illumination mode and the second illumination mode to light source 100 based on the association, by reference to the illumination mode determination information.

With this, lighting device 10 makes it possible to change an illumination pattern according to whether a holder of an ID card etc. is admitted, or a security level etc. associated with the holder.

The first illumination mode and the second illumination mode differ in at least one of a luminance and a color of emission light of light source 100. Moreover, for example, the first illumination mode and the second illumination mode may differ in one of on or off of light and a rate of blinking of light source 100, and at least one of the first illumination mode and the second illumination mode may include an illumination mode in which a visible light communication is performed by blinking light source 100.

With this, lighting device 10 makes it possible to transmit information helpful to security by changing an illumination pattern according to whether a holder of an ID card etc. is admitted, or a security level etc. associated with the holder.

It is to be noted that an illumination pattern including high-speed blinking as described above can be achieved by causing light source 100 to include, for example, a light-emitting diode.

Moreover, two or more ID readers 130 may be provided, and the read area of ID reader 130 may be a set of sub-read areas which correspond to the one or more ID readers, respectively, and which are smaller than the read area. Alternatively, ID reader 130 may include a sub-read area smaller than the read area, and the read area of ID reader 130 may be a continuous trajectory of the sub-read area swept in a space by ID reader 130.

When the detection area of human detector 120 and the road area of ID reader 130 have a low degree of matching, accuracy of the determination for the match between the number of people indicated by the human detection information and the number of the identifications is reduced. The above configuration makes it easier to increase a degree of matching between the detection area of human detector 120 and the read area of ID reader 130.

Accordingly, lighting device 10 including the configuration makes it possible to perform the determination with higher accuracy.

Embodiment 2

1. Configuration

Figure 11:
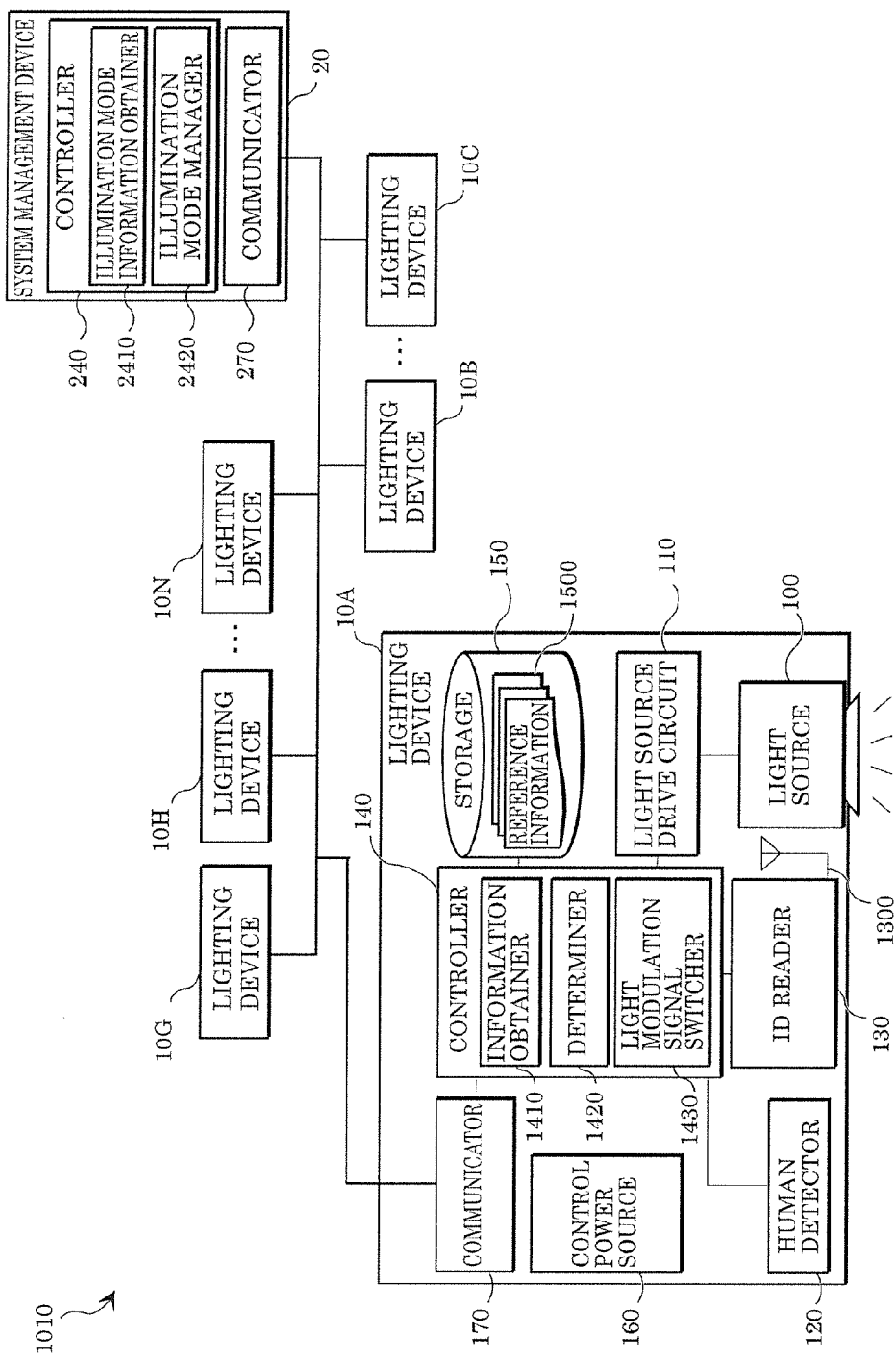
FIG. 11 is a functional block diagram illustrating a lighting device according to Embodiment 2.

FIG. 11 is a functional block diagram illustrating a configuration of a lighting system according to Embodiment 2.

Lighting system 1010 according to Embodiment 2 includes lighting devices 10A to 10N and system management device 20. Lighting devices 10A to 10N have the same configuration, and thus FIG. 11 shows as a representative only the configuration of lighting device 10A.

Lighting devices 10A to 10N have almost the same configuration as lighting device 10 in Embodiment 1. The same structural elements as the structural elements of lighting device 10A are referred to by the same reference signs as lighting device 10, and a description thereof is omitted in Embodiment 2. In addition, to collectively indicate lighting devices 10A to 10N below, lighting device 10A to 10N may be also referred to as a lighting device group for the sake of convenience in Embodiment 2.

Lighting devices 10A to 10N differ from lighting device 10 in that lighting devices 10A to 10N each include communicator 170. Communicator 170 is a communication module for communicating with at least system management device 20 via a wired or wireless connection, in lighting system 1010. What is transmitted to system management device 20 via communicator 170 is information which indicates the illumination mode that controller 140 applies to light source 100 based on the determination in step S24, step S54A, or step S54B in Embodiment 1.

It is to be noted that the lighting device group may include multiple lighting devices, and is not limited to an example illustrated in FIG. 11. Each lighting device included in such a lighting device group is an example of either of a first lighting device or a second lighting device in Embodiment 2.

System management device 20 includes controller 240 and communicator 270.

Controller 240 is implemented by a microcontroller including a processor, a memory, and input/output ports which are not shown, and controls the operation of system management device 20. Moreover, controller 240 includes illumination mode information obtainer 2410 and illumination mode manager 2420 which are functional elements provided by executing a program stored in the memory.

Illumination mode information obtainer 2410 obtains, from each of lighting devices 10A to 10N, information which indicates an illumination mode applied to lighting source 100, via communicator 270.

Illumination mode manager 2420 transmits via communicator 270 an instruction to switch, based on the information which indicates the illumination mode currently applied in a lighting device of the lighting device group and which is obtained by illumination mode information obtainer 2410, an illumination mode applied in another lighting device of the lighting device group. Details thereof will be described below.

It is to be noted that the above operation of illumination mode information obtainer 2410 and illumination mode manager 2420 may be described below as the operation of controller 240 for the sake of simplicity.

Communicator 270 is a wired communication module or a wireless communication module for communicating with the lighting device group as stated above.

Such system management device 20 is an exemplary management device in Embodiment 2, and is implemented using, for example, at least one server device which is on a network and in which application software for performing operation to be described below is installed.

Lighting system 1010 thus configured is installed in a restricted place such as an office of a company and an event site or a facility at least partially including a place for which an entry restriction level is changed, for example. Moreover, in this facility, each lighting device of lighting system 1010 is installed in, for example, the vicinity of a doorway to the facility, the vicinity of a doorway to each room, and a passage connecting these. An installation location of system management device 20 is not particularly limited as long as the installation location allows communication with each lighting device. For example, system management device 20 may be installed in a security room in which a security guard is present in the facility or a place managed by a security service company remote from the facility.

The reason why the lighting devices are installed decentrally in the facility as above is because it is intended to make easier detecting an unauthorized visitor to the facility and subsequently tracking the visitor. The following describes the operation of such lighting system 1010 using an example.

2. Exemplary Operation

The operation of lighting system 1010 according to Embodiment 2 will be described using, as an example, a case where an unauthorized visitor is in a restricted area in a facility in which lighting system 1010 is installed. In addition, lighting system 1010 uses the blacklist format in the example. More specifically, when an identification read by ID reader 130 of a lighting device among lighting devices 10A to 10N is not included in reference information 1500, the mode applied to light source 100 of the lighting device is switched from the normal mode (an example of a first illumination mode in Embodiment 2) to the abnormal mode (an example of a second illumination mode in Embodiment 2). Light source 100 at least transmits a light ID in the abnormal mode. When the light ID is received by a camera capturing the illumination area of each of lighting devices 10A to 10N, a message including information indicated by the light ID may be displayed on one of monitors included in a monitoring system in the facility, for example.

Figure 12:
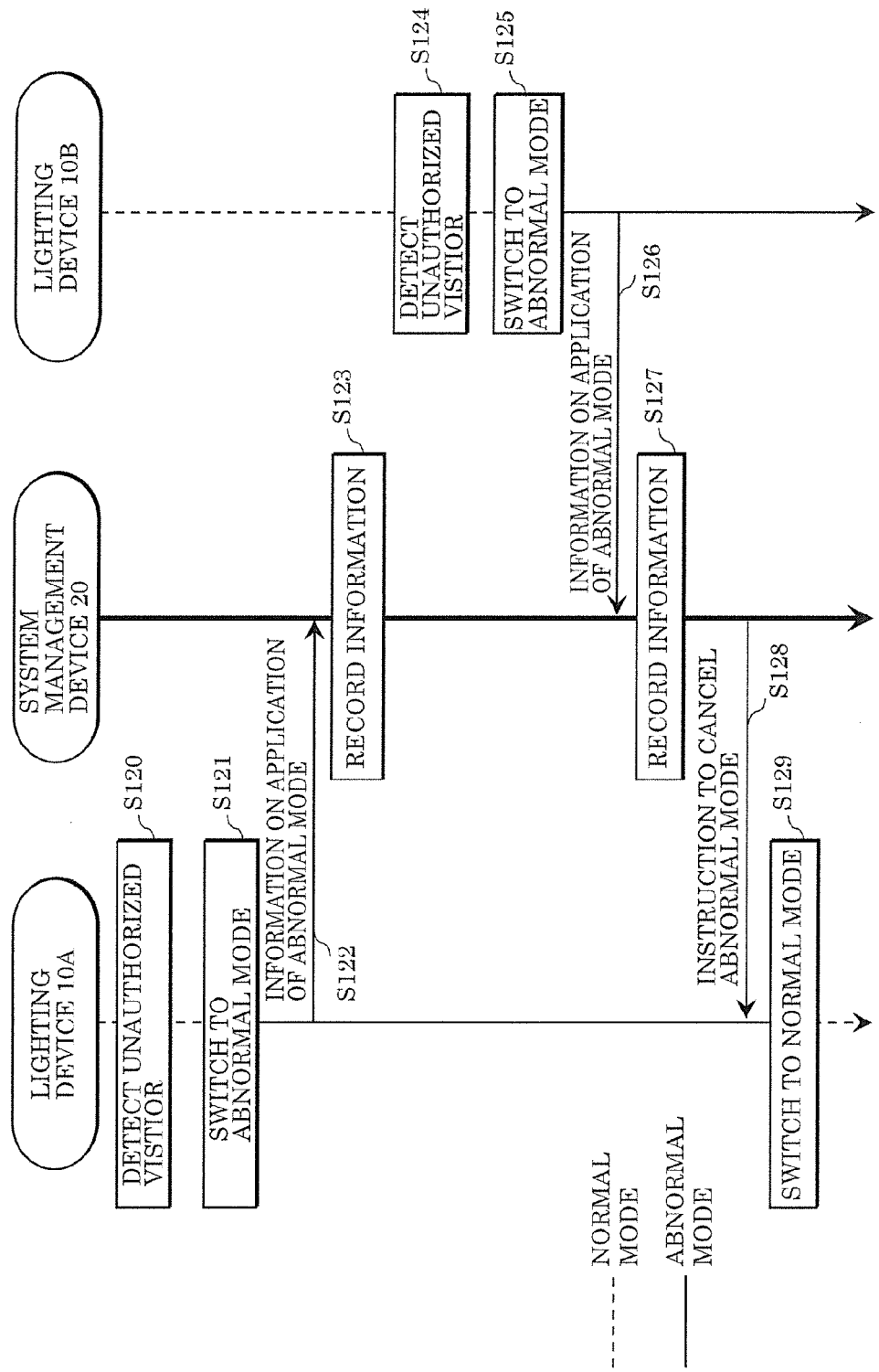
FIG. 12 is a sequence diagram illustrating exemplary operation of the lighting device according to Embodiment 2.

FIG. 12 is a sequence diagram illustrating the exemplary operation. Lighting devices 10A and 10B illustrated in the figure are representatives of the lighting devices, and the other lighting devices in the lighting device group are capable of performing the same operation as lighting devices 10A and 10B.

Figure 13A:
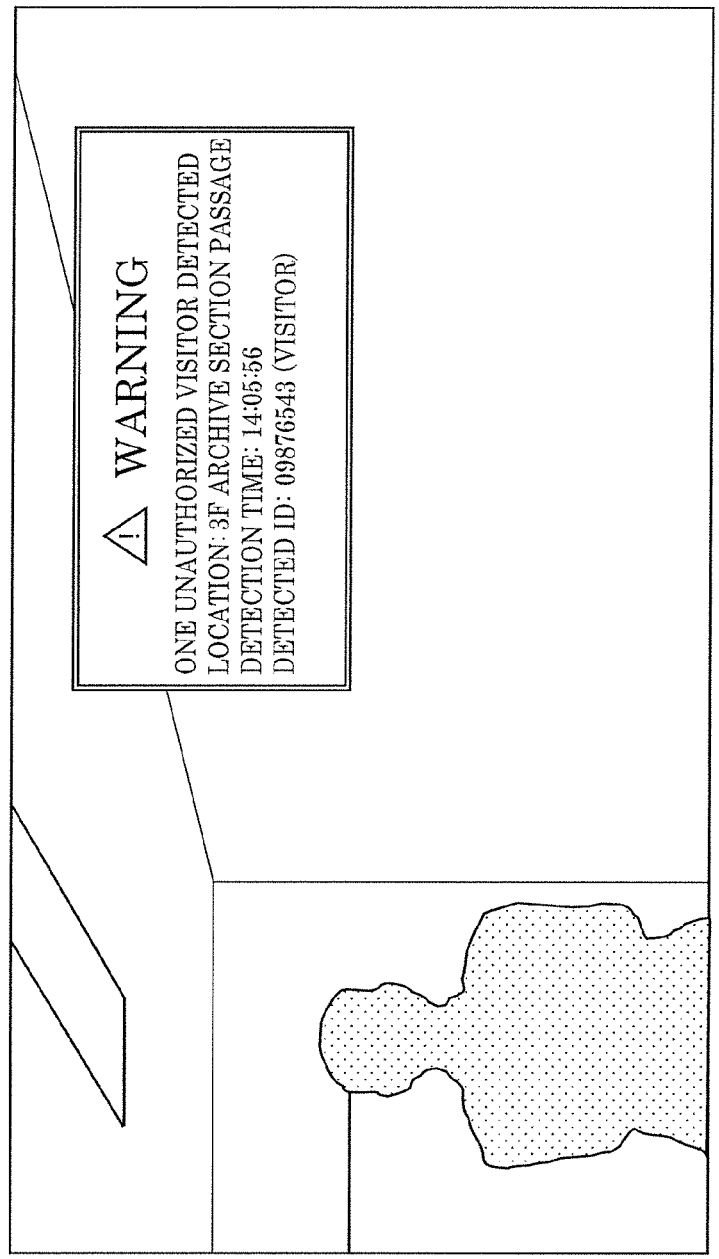
FIG. 13A is a diagram illustrating an exemplary screen which displays information transmitted from a lighting device in a lighting system according to Embodiment 2.

First, it is assumed that lighting device 10A installed in the vicinity of a doorway to the restricted area in the facility reads an identification not included in reference information 1500. Specifically, in this case, lighting device 10A detects an unauthorized visitor (step S120). Subsequently, application of the abnormal mode is started in lighting device 10A (step S121). With this, lighting device 10A transmits a light ID, and an image including a warning message as illustrated in FIG. 13A is displayed on, among the monitors of the monitoring system, a monitor corresponding to the camera capturing the illumination area of lighting device 10A, for example.

In the meantime, lighting device 10A transmits to system management device 20 information which indicates that the abnormal mode is currently applied in lighting device 10A (step S122). Controller 240 of system management device 20 having received the information stores the information into a memory (step S123).

Figure 13B:
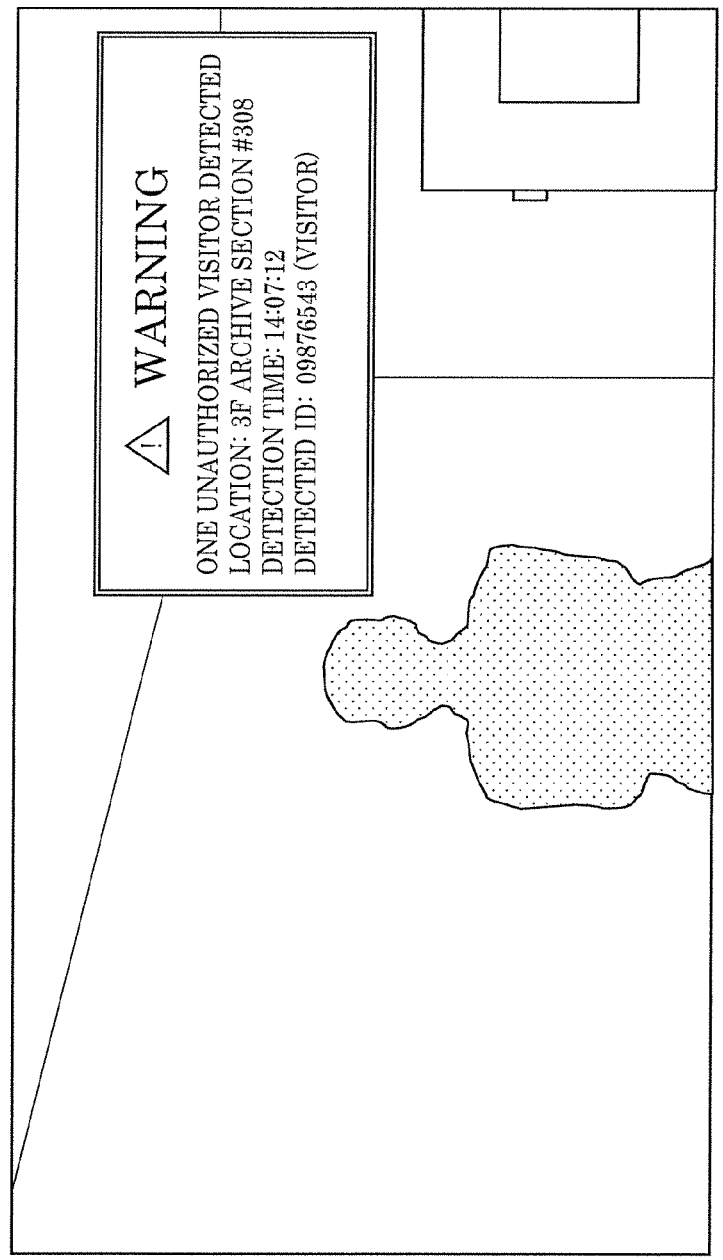
FIG. 13B is a diagram illustrating an exemplary screen which displays information transmitted from another lighting device in the lighting system according to Embodiment 2.

It is assumed that lighting device 10B in another place subsequently detects the unauthorized visitor (step S124). Application of the abnormal mode is started in lighting device 10B (step S125). With this, lighting device 10B transmits a light ID, and an image as illustrated in FIG. 13B is displayed on, among the monitors of the monitoring system, a monitor corresponding to the camera capturing the illumination area of lighting device 10B. At this time both the image illustrated in FIG. 13A and the image illustrated in FIG. 13B are displayed on the monitors of the monitoring system.

In the meantime, lighting device 10B transmits to system management device 20 information which indicates that the abnormal mode is currently applied in lighting device 10B (step S126). Controller 240 of system management device 20 having received the information stores the information into the memory (step S127). In addition, controller 240 of system management device 20 further transmits an instruction to cancel the abnormal mode (step S128).

Lighting device 10A having received the instruction to cancel the abnormal mode from system management device 20 stops the application of the abnormal mode and starts application of the normal mode (step S129). With this, the image illustrated in FIG. 13B is displayed on the monitor of the monitoring system, and the image including the warning message illustrated in FIG. 13A is cleared.

The unauthorized visitor is detected and tracked by such operation. In addition, the tracking can be easily performed by viewing images on the monitors. For example, it is difficult to track a specific person using images on monitors in a facility in which many people move or gather. Moreover, deploying many security guards in a facility or dispatching many security guards at a time of an abnormality may sometimes ruin an atmosphere in the facility or create confusion. By using lighting system 1010, it is possible to dispatch a minimum necessary number of security guards to the unauthorized visitor without being noticed by the unauthorized visitor or people around the unauthorized visitor.

3. Other Exemplary Operation

Although the case where the light IDs are transmitted and the information is displayed on the monitors of the monitoring system is described as the example above, the information may be displayed in a different manner in Embodiment 2. For example, the information may be displayed on smart glasses of a security guard patrolling in a facility or presented in audio via earphones.

Moreover, although the example where the unauthorized visitor is tracked by the lighting devices in the different places portioned by walls etc. such as the passage and rooms is described above, such tracking may be performed by lighting devices in one large place such as a gathering site and an exhibition room, for example. In this case, the lighting devices applying the abnormal mode to light sources 100 are switched as the unauthorized visitor moves in the place. The security guard can track the unauthorized visitor by being successively informed via the smart glasses by the lighting devices operating in the abnormal mode.

4. Other Exemplary Configurations

Aforementioned lighting system 1010 includes system management device 20 which has the different configuration from each lighting device in the lighting device group and manages switching of the illumination mode of each lighting device. Instead, in each or part of the lighting devices in the lighting device group, controller 140 may include functional elements equivalent to aforementioned illumination mode information obtainer 2410 and illumination mode manager 2420, and controllers 140 may transmit to each other an instruction to cancel an illumination mode or switch to another illumination mode.

5. Advantageous Effects Etc.

Lighting system 1010 according to Embodiment 2 includes: a first lighting device and a second lighting device, each of which is lighting device 10 according to Embodiment 1; and system management device 20 which is communicably connected to the first lighting device and the second lighting device.

System management device 20: obtains information indicating whether an illumination mode applied to light source 100 is one of the first illumination mode and the second illumination mode in each of the first lighting device and the second lighting device; and stops application of the second illumination mode to the first lighting device when application of the second illumination mode is started in the second lighting device after application of the second illumination mode to the first lighting device is started.

With this, an unauthorized visitor can be easily tracked. Moreover, because a security guard is allowed to approach the unauthorized visitor without being noticed by the unauthorized visitor or people around the unauthorized visitor, it is possible to minimize ruining of an atmosphere at a place or confusion at a time of an abnormality.

OTHER EMBODIMENTS ETC.

Although the lighting device and the lighting system according to the present disclosure have been described above based on Embodiments 1 and 2, the present disclosure is not limited to the embodiments and variations. Various modifications to the embodiments which may be conceived by those skilled in the art, as well as embodiments resulting from combinations of some of the structural elements of the embodiments and structural embodiments of the modifications are to be included within the scope of the present disclosure, as long as such modifications and embodiments do not depart from the essence of the present disclosure.

For example, in Embodiments 1 and 2, in a case where human detector 120 included in each of lighting device 10 and the lighting devices of the lighting device group is an image sensor, human detector 120 may serve as monitoring camera C1 provided separately from lighting device 10 in FIG. 2A and FIG. 2B.

Moreover, for example, the illumination pattern of light source 100 may be always changed when the determination in step S24 is made, and the change may differ in accordance with a result of the determination in Embodiment 1. As a specific example, light source 100 may blink at a different rate or a different number of times between cases where the result of the determination in step S24 is YES and NO. It is to be noted that in this case, the normal mode is interpreted as an illumination mode different from the first illumination mode and the second illumination mode.

Furthermore, although Embodiments 1 and 2 are described above using, as the example, the two illumination modes, the first illumination mode and the second illumination mode, the number of illumination modes selectable by one lighting device is not limited to two.

Moreover, controller 140 causes ID reader 130 to read the identification in the read area upon the obtaining of the human detection information in the procedure for the exemplary operation in Embodiment 1. This process is used in a place where continuous radio transmission is regulated by law etc., for example. Technically, controller 140 is capable of obtaining an identification all the time (in a very short cycle) from ID reader 130. Accordingly, in a place without such regulation, for example, operation for detecting a person by human detector 120 and operation (radio transmission) for obtaining an identification by ID reader 130 may be cyclically performed in synchronization with each other.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A lighting device comprising:
    a light source which is switchable between a first illumination mode and a second illumination mode to perform illumination;
    a human detector which detects a person in a detection area of the human detector in an illumination area of the light source;
    an identification (ID) reader which wirelessly reads an identification stored in a radio-frequency (RF) tag in a read area of the ID reader corresponding to the detection area; and
    a controller which is communicably connected to the light source, the human detector, and the ID reader,
    wherein the controller:
        obtains, from the human detector, human detection information indicating that one or more persons are present in the detection area;
        obtains from the ID reader one or more identifications read by the ID reader when the human detector detects the one or more persons; and
        applies one mode of the first illumination mode and the second illumination mode to the light source based on the human detection information and the one or more identifications which have been obtained, and
    the light source performs illumination in the applied mode.

2. The lighting device according to claim 1,
wherein the human detection information further indicates a total number of the one or more persons in the detection area, and
the controller applies the first illumination mode to the light source in a case where the total number of the one or more persons indicated by the human detection information and a total number of the one or more identifications match, and applies the second illumination mode to the light source in a case where the total number of the one or more persons indicated by the human detection information and the total number of the one or more identifications mismatch.

3. The lighting device according to claim 1,
wherein the controller is further communicably connected to a storage which stores illumination mode determination information indicating an association between each of the one or more identifications and one of the first illumination mode and the second illumination mode, and
when obtaining the one or more identifications, the controller applies one mode of the first illumination mode and the second illumination mode to the light source based on the association, by reference to the illumination mode determination information.

4. The lighting device according to claim 1,
wherein the first illumination mode and the second illumination mode differ in at least one of a luminance and a color of emission light of the light source.

5. The lighting device according to claim 1,
wherein the first illumination mode and the second illumination mode differ in one of on or off of light and a rate of blinking of the light source.

6. The lighting device according to claim 1,
wherein at least one of the first illumination mode and the second illumination mode includes an illumination mode in which a visible light communication is performed by blinking the light source.

7. The lighting device according to claim 1,
wherein the light source includes a light-emitting diode.

8. The lighting device according to claim 1,
wherein two or more ID readers are provided, and the read area is a set of sub-read areas which correspond to the two or more ID readers, respectively, and which are smaller than the read area.

9. The lighting device according to claim 1,
wherein the ID reader includes a sub-read area smaller than the read area, and the read area is a continuous trajectory of the sub-read area swept in a space by the ID reader.

10. A lighting system comprising:
    a first lighting device and a second lighting device, each of which is the lighting device according to claim 1; and
    a management device which is communicably connected to the first lighting device and the second lighting device,
    wherein the management device:
        obtains information indicating whether an illumination mode applied to the light source is one of the first illumination mode and the second illumination mode in each of the first lighting device and the second lighting device; and
        stops application of the second illumination mode to the first lighting device when application of the second illumination mode is started in the second lighting device after application of the second illumination mode to the first lighting device is started.

* * * * *